UNITED STATES PATENT OFFICE.

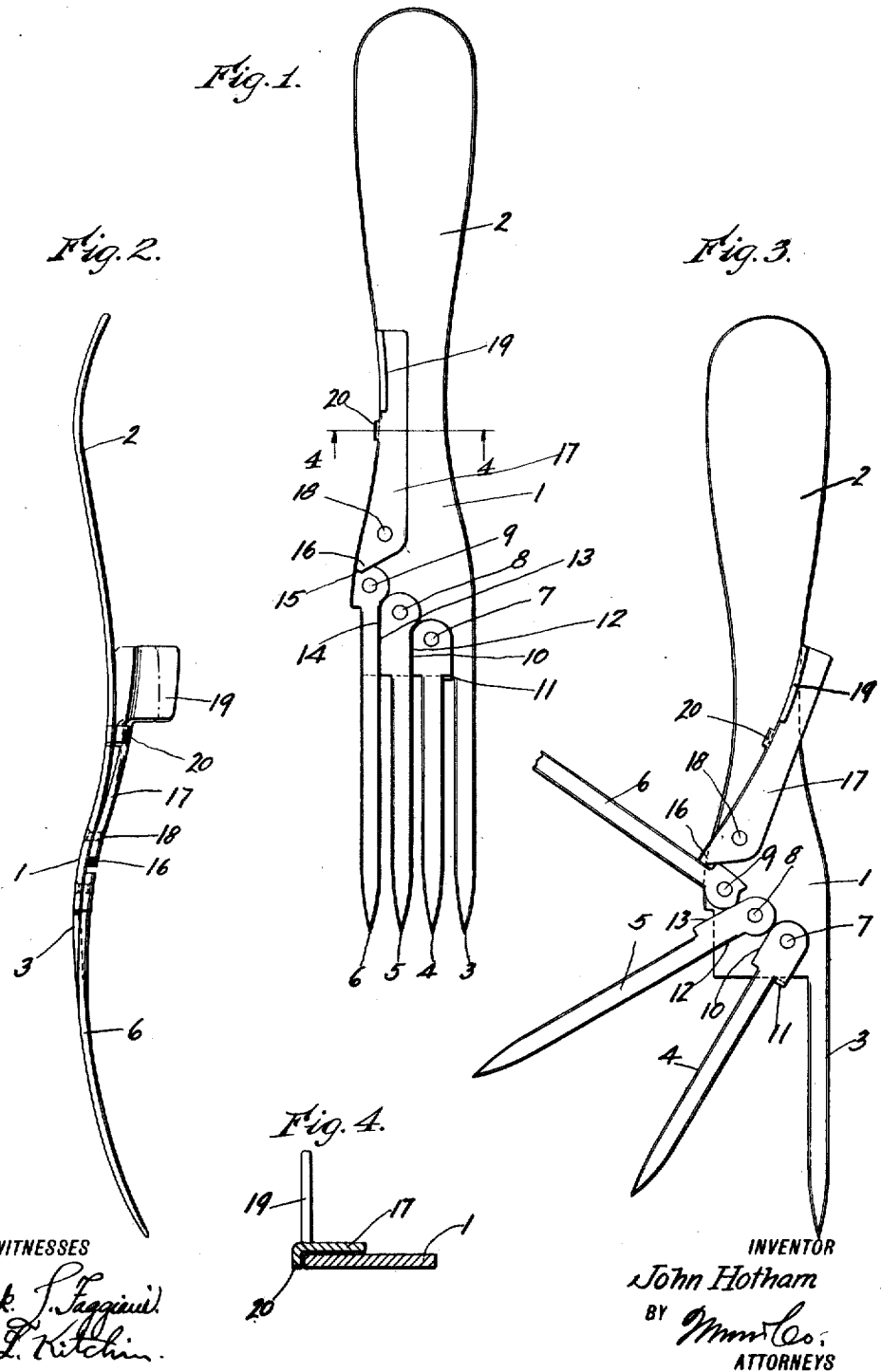

JOHN HOTHAM, OF FORT PIERCE, FLORIDA.

FORK.

1,274,358.  Specification of Letters Patent.  Patented July 30, 1918.

Application filed January 11, 1918. Serial No. 211,377.

*To all whom it may concern:*

Be it known that I, JOHN HOTHAM, a citizen of the United States, and a resident of Fort Pierce, in the county of Saint Lucie and State of Florida, have invented a new and Improved Fork, of which the following is a full, clear, and exact description.

This invention relates to forks, and has for an object the provision of an improved sanitary construction capable of easy cleaning.

Another object of the invention is to provide a fork with removable tines and a locking structure whereby the tines may be separated for cleaning and then locked in their proper position for use.

In the accompanying drawing:

Figure 1 is a plan view of a fork disclosing an embodiment of the invention.

Fig. 2 is an edge view of the structure shown in Fig. 1, the locking means being partially released.

Fig. 3 is a view similar to Fig. 1, but with the tines separated for cleaning.

Fig. 4 is a sectional view through Fig. 1 on line 4—4.

Referring to the accompanying drawing by numerals 1 indicates the body of the fork which is provided with a handle 2 of any desired kind and tines 3, 4, 5 and 6, tine 3 usually being an extension of the body 1, though it may be separate and secured thereto. This tine is rigid with the body 1 while tines 4, 5 and 6 are pivotally mounted on body 1 by pivotal members 7, 8 and 9. The shank or pivotal end of tine 4 is provided with a squared edge 10 with a depending lug or spur 11, said lug or spur acting against tine 3 for holding tine 4 parallel therewith when moved from the position shown in Fig. 3 to the position shown in Fig. 1. The flat edge 10 of tine 4 is designed to engage the flat edge 12 of tine 5 for holding tine 5 parallel with tine 4. A flat edge 13 is also provided on the shank or pivotal end of tine 5 for engaging the flat edge 14 of tine 6. Tine 6 is provided with a notch 15 engaging the locking end 16 of the locking member 17. The locking member 17 is pivotally mounted at 18 on the body 1 and is provided with a thumb engaging member 19 and a locking stop 20. The stop 20 is normally pressing against the edge of the body 1 as shown in Figs. 1 and 4 whereby the locking member 7 is held in a locked position and the tines held in operative position as shown in Fig. 1. As the locking stop 20 is comparatively short, the pressure on member 19 by the thumb in a direction at an angle to the plane of the body 1 and also toward the opposite edge of the body would result in the locking stop 20 moving upwardly to the position shown in Fig. 3 and then the entire locking member moved over to the position shown in Fig. 1. The tines 4, 5 and 6 may then be moved to the position shown in Fig. 3 so as to be thoroughly cleaned and reassembled for use. The ordinary fork now in common use is provided with a number of tines formed integral with or rigidly secured to the body so that the upper and lower surfaces may be easily washed, but the edges of the tines cannot be readily washed and usually are not engaged at all by a wash cloth or by a drying cloth so that more or less objectionable matter remains thereon, even though the fork is subjected to washing in water. By providing means for separating the tines each tine may be surrounded by a washing cloth and a drying cloth for thoroughly removing any objectionable matter thereon.

What I claim is:

1. A fork comprising a body having a handle, said body having a tine extending from one edge thereof and formed integral therewith, and a plurality of tines pivotally mounted on said body, said tines having squared portions for causing the same to line up in parallelism, and also in parallelism with said first mentioned tine, one of said pivotally mounted tines having a notch, and a pivotally mounted locking member mounted on said body formed with a projection fitting into said notch for locking said tines against movement when in a parallel position.

2. A fork of the character described comprising a body having a fixed tine, a plurality of pivotally mounted tines normally arranged parallel with the fixed tine, one of the pivotally mounted tines having a notch, and a locking member pivotally mounted on said body formed with a projection fitting into said notch when the tines are parallel, a stop engaging said body, and a thumb member arranged adjacent the end opposite said projection whereby a locking member may be moved freely in either direction for permitting a separation of said tines or for locking the tines in a parallel position.

JOHN HOTHAM.

Copies of this patent may be obtained for five cents each, by addressing the "Commissioner of Patents, Washington, D. C."